United States Patent [19]
Coetsier et al.

[11] Patent Number: 5,889,206
[45] Date of Patent: *Mar. 30, 1999

[54] PROCESS AND DEVICE FOR BALANCING A ROTATING BODY BY ADDITION OF BALANCING WEIGHTS

[75] Inventors: Paul Coetsier, Pomponne; Denis Douine, Lagny Sur Marne, both of France

[73] Assignee: Muller BEM, Chartres Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 720,810
[22] Filed: Oct. 1, 1996

[30] Foreign Application Priority Data

Oct. 4, 1995 [FR] France ................... 95 11652

[51] Int. Cl.⁶ ....................................... G01M 1/38
[52] U.S. Cl. ............................................. 73/462
[58] Field of Search ................... 73/462, 468, 460; 301/5.21

[56] References Cited

U.S. PATENT DOCUMENTS

| | | |
|---|---|---|
| 4,085,619 | 4/1978 | Shapiro et al. ................. 73/462 |
| 4,285,240 | 8/1981 | Gold ............................ 73/462 |
| 4,341,119 | 7/1982 | Jackson et al. ................. 73/462 |
| 4,554,734 | 11/1985 | Sander ........................ 73/468 |
| 5,001,408 | 3/1991 | Kyogoku et al. ................ 73/468 |
| 5,209,116 | 5/1993 | Okumura ...................... 73/462 |
| 5,329,814 | 7/1994 | Betz et al. ................... 73/462 |
| 5,661,672 | 8/1997 | Gnielka et al. ................ 73/462 |

FOREIGN PATENT DOCUMENTS 0 383 038   8/1990   European Pat. Off. .

OTHER PUBLICATIONS

Patent Abstracts of Japan, vol. 7, No. 249 (p. 234) (1394) Nov. 1983.

Primary Examiner—John E. Chapman
Attorney, Agent, or Firm—Young & Thompson

[57] ABSTRACT

A process and a device (1-8, 10-13) for balancing a rotating body (9) by the addition of balancing weights, start the body (9) rotating and measure the unbalance. The inertia of the body and the balancing weights to be emplaced in each weight plane at a corresponding predetermined diameter is evaluated. The rotating body (9) is stopped and blocked in a position corresponding to the emplacement of a weight in a first weight plane and in a first predetermined radial direction. Used in the balancing of vehicle wheels.

5 Claims, 4 Drawing Sheets

5,889,206

PROCESS AND DEVICE FOR BALANCING A ROTATING BODY BY ADDITION OF BALANCING WEIGHTS

FIELD OF THE INVENTION

The invention relates to a process for balancing a rotating body by the addition of balancing weights, as well as to a balancing device for a rotating body by the addition of balancing weights.

The invention is particularly useful in its application to the balancing of vehicle wheels.

BACKGROUND OF THE INVENTION

Known vehicle wheel balancers have the drawback either of being rudimentary and requiring several operations for computation and successive testing, or on the contrary of being sophisticated in the sense of requiring a tree-structured program that indicates to the operator a series of operations to be followed in a certain order and requires the operator to recommence the sequence of operations when the sequence has been partially or poorly executed.

SUMMARY OF THE INVENTION

The invention has for its object to overcome these drawbacks, by means of a new process for balancing a rotating body by the addition of balancing weights and by means of a corresponding device, thanks to which the balancer automatically goes in the predetermined radial direction facilitating the placing of balancing weights by using a rapid non-branching method with improved reliability.

To this end, the example uses the concept of programming with fuzzy logic.

The invention has for its object a process for balancing a rotating body by the addition of balancing weights, comprising the following steps:

a) starting the body to rotate and measuring the unbalance,
b) computing the balancing weights to be used in each plane of weight placement of a corresponding predetermined diameter,
c) stopping and blocking the rotating body in a position corresponding to the position of a mass in a first placement plane and in a first predetermined radial direction,
d) displacing the rotating body beyond the position reached in step c),
e) stopping and blocking the rotating body in a position corresponding to the positioning of a mass in a second placement plane and in a second predetermined radial direction.

Preferably, the rotating body is displaced manually in step d).

Step c) or e) is preferably carried out automatically by a program according to fuzzy logic using a physical parameter representative of the inertia of the rotating body.

The physical parameter representative of the inertia of the body is measured preferably in step b), or measured and computed prior to step a) of the process.

This program preferably uses as primary determinants: a parameter representative of the inertia of the rotating body and the angular spacing of the rotating body relative to the predetermined radial direction to be reached for positioning the mass.

The program moreover concerns the speed of rotation of the turning body to bring this speed of rotation within a range defined by means of the primary determinants.

The invention also has for its object a balancing device for a rotating body by addition of balancing weights, comprising means to start the body rotating and measuring the unbalance, means to measure a parameter representative of the inertia of the rotating body and computing the balancing weights to be positioned in each weight positioning plane at a corresponding predetermined diameter, and means to stop and block the rotating body in a position corresponding to the positioning of a weight in a first positioning plane and in a first predetermined radial direction.

According to other characteristics of the invention:

the means to start, stop and block the rotating body comprises an asynchronous motor with two directions of rotation associated with an electromagnetic, pneumatic, hydraulic or mechanical brake;

the device comprises electrical means for regulating the energy in the two directions of rotation;

the electrical means acts by cutting the energy supply determined by a program according to fuzzy logic.

BRIEF DESCRIPTION OF THE DRAWINGS

The invention will be better understood from the description which follows given by way of non-limiting example with reference to the accompanying drawings, in which.

DETAILED DESCRIPTION OF THE INVENTION

Figure 1:
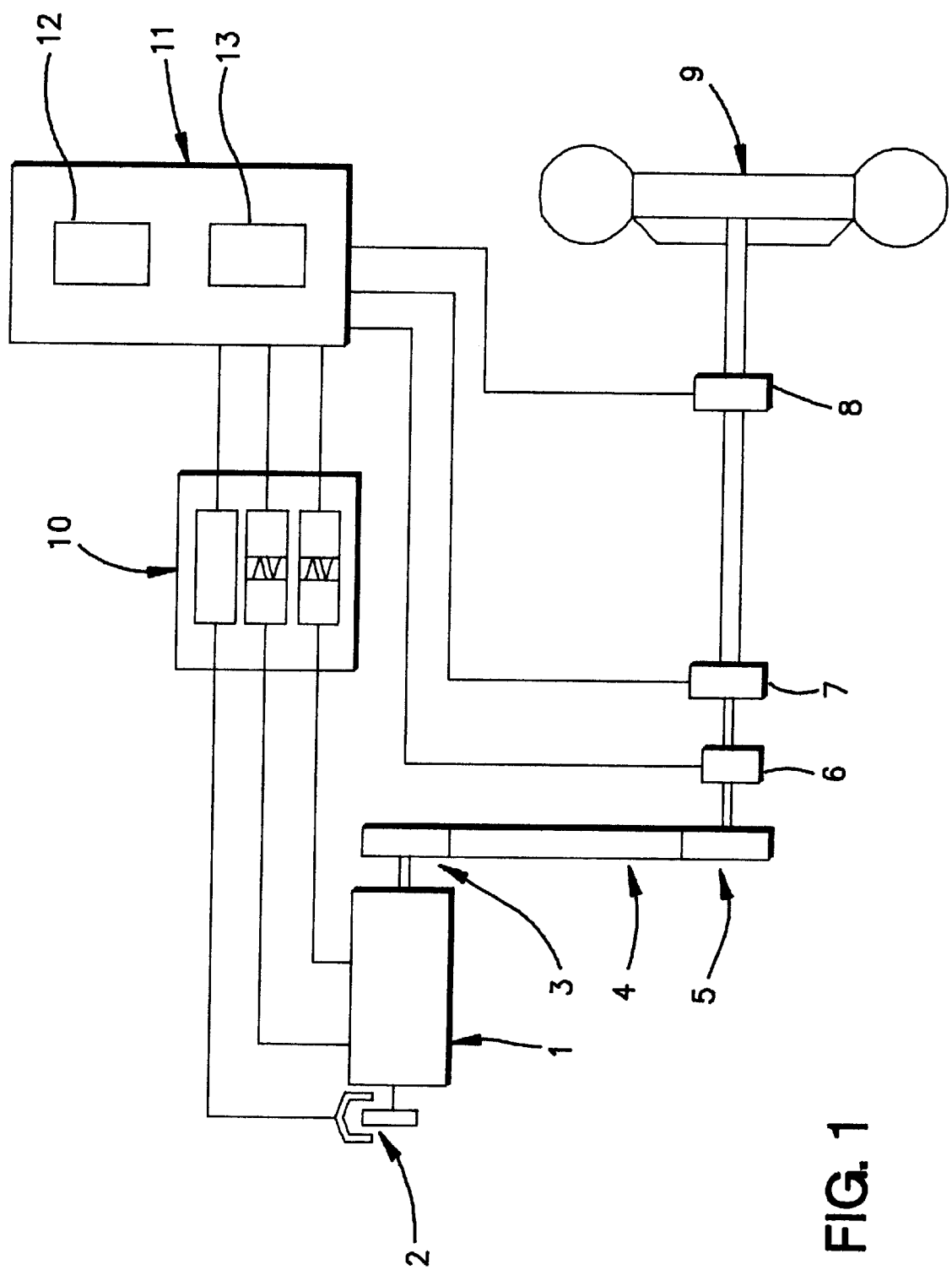
FIG. 1 shows schematically the arrangement of a device according to the invention.

Referring to FIG. 1, a device according to the invention comprises: an electric drive motor 1 associated with an electromagnetic brake 2 and driving a pulley 3, a belt 4 and another pulley 5 of measurement apparatus driven in rotation. The measurement apparatus driven in rotation comprises a rotary encoder 6 and two bearing 7 and 8 each instrumented with piezoelectric detectors to permit the computation of the unbalance and inertia of a rotating body 9, for example a vehicle wheel 9.

The motor 1 is preferably an asynchronous motor with two directions of rotation supplied by means of a power card 10 comprising regulation means of the triac type, which may be in turn controlled by an opto-triac. The brake 2 is controlled by the same power card 10 at the moment at which it is desired to block rotation of the motor 1 and as a result of the movable apparatus 5, 6, 7, 8 and 9 in rotation about its axis.

An electronic control card 11 by microprocessor control comprises particularly a clock 12 and means 13 for the detection of the passage of zero of the sector phase.

Thanks to the detection of the zero passage of the sector phase, it is possible to sample the time by taking as an origin the passage of zero of the sector phase and as the scaling factor a multiple of the clock pulses 12. This sampling permits cadencing used to cut the electrical energy supply during a predetermined portion of the sector phase, so as to send to the windings of the asynchronous motor 1 energy pulses of a power value determined in one direction of rotation or the other.

This control principle of the electrical asynchronous motor thus permits producing electrical braking, when the electric motor 1 receives electrical power impulses tending to cause the motor to turn in the reverse direction from its actual direction of rotation: the electric braking thus provided permits increasing or reducing speed of rotation of the single-phase asynchronous electric motor 1 in one direction or the other, to a low speed of rotation, from which the electric motor is in danger of entering a regime of oscillation about a predetermined radial position.

When the electric motor 1 is thus in a position of danger of weak oscillation about a predetermined angular value, the brake 2 is then actuated which blocks the rotation of the motor and cuts the electrical supply of the latter to avoid excessive heating of the windings of the motor.

This simple principle for the regulation of speed and of the position of the electric motor permits, thanks to the transmission by pulleys 3. and 5 connected by the belt 4, to adjust the position of the rotating body 9 to bring the latter into a predetermined radial direction facilitating the emplacement of balancing weights by the operator.

Thanks to this device, it thus suffices to:

a) start the body rotating and measure the unbalance;

b) measure a physical parameter representative of the inertia of the rotating body and calculate the balancing weights to be emplaced in each plane of positioning of the weights and at a corresponding predetermined diameter;

c) stop and block the rotating body in a position corresponding to the emplacement of a weight in a first weight plane and in a first predetermined radial direction.

The first predetermined radial direction can be selected by the operator: in the case of the placement of lead weights gripping on steel rims, this first predetermined radial direction is preferably the "noon" position corresponding to the summit of the rim and with gripping from above; in the case of cemented weights applied with pressure, the first predetermined radial direction is preferably a direction located substantially at nine o'clock, which is to say making an angle of 90° with the radius corresponding to the noon position.

The first predetermined radial direction or other predetermined radial directions can be automatically selected by the program as a function of the nature of the balancing weights to be clamped or cemented on and of the position of the displaceable member serving to apply the weights.

Preferably, after having applied the first balancing weight in the first weight plane, the process according to the invention provides for moving the rotating body beyond the position reached in the preceding step, so as to stop and block the rotating body in a position corresponding to the position for applying the weight in the second weight plane and in a second predetermined radial position identical to or different from the first mentioned predetermined radial direction.

Preferably, to be certain of the intervention of the operator and of the positioning of the first balancing weight, it is provided that the displacement of the rotating body beyond the position corresponding to the addition of the first balancing weight is effected by manual action of the operator on the movable rotatable device bearing the rotating body. In the case of a wheel, the operator simply turns the wheel through a certain angle beyond its immobilization position, which serves to restart the drive motor which then seeks out, under the control of a program using fuzzy logic, the second position corresponding to the placement of a weight in the second weight plane and in said second mentioned predetermined radial direction.

As indicated, the process of balancing according to the invention is preferably conducted with the aid of a program using fuzzy logic and using as primary decision determinants: the inertia of the rotating body determined in step b) and the angular spacing of the rotating body relative to the predetermined radial direction to be reached for positioning the weight; this angular spacing of the rotating body being obtained by the instantaneous difference of the angular position of the rotating body given by the rotary encoder 6 and of the radial direction predetermined as a function of the work to be performed.

Figure 2:
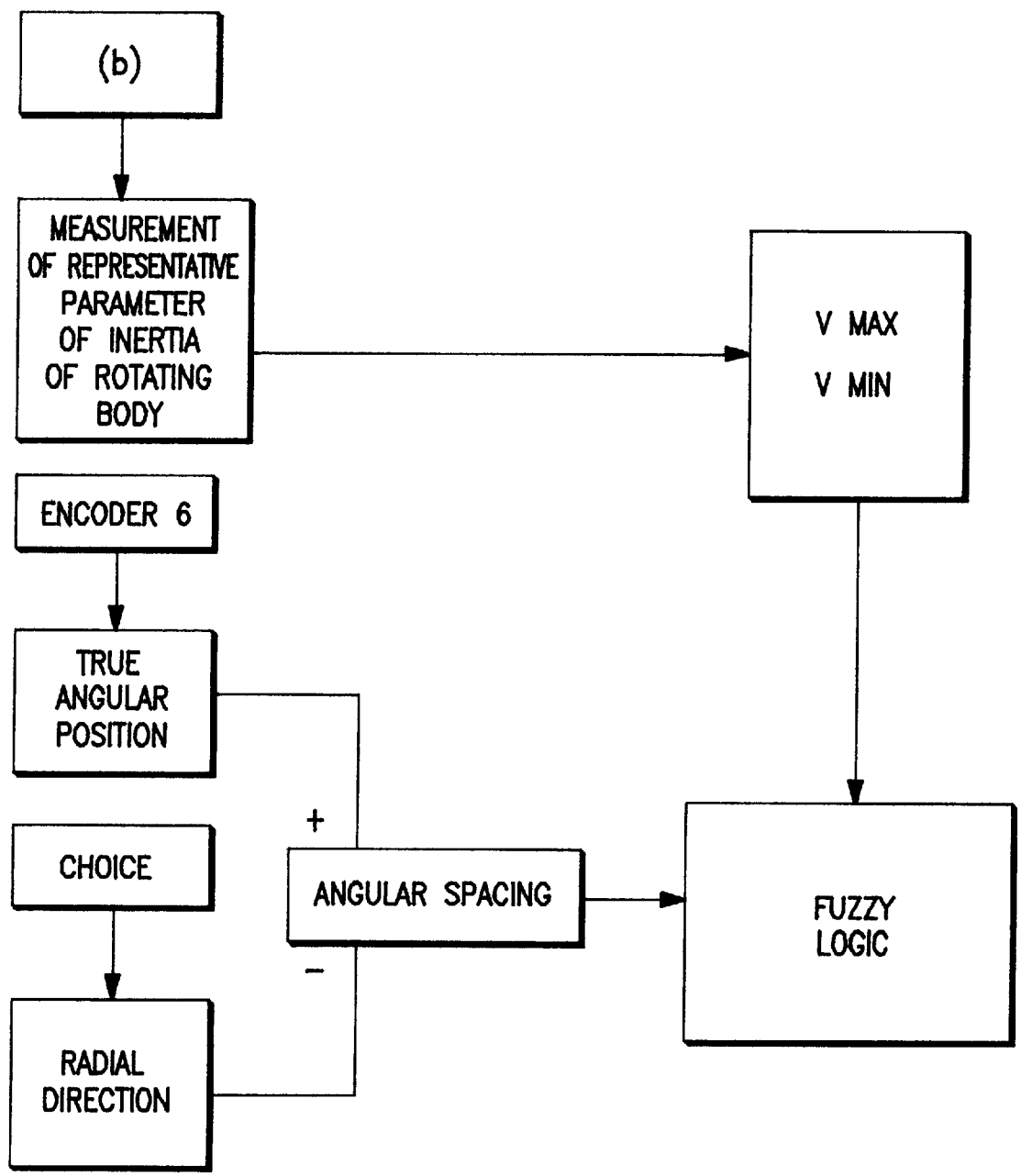
FIG. 2 shows schematically the principle of operation of the process according to the invention.

In FIG. 2, it will-be seen that the inertia of the rotating body to be balanced is evaluated by the measurement of a representative parameter, preferably during the process according to the invention, that the real angular position of the rotating body is given in a practically instantaneous manner by the rotary encoder 6; that the predetermined radial direction results from a choice of the operator or of a decision program taking account of the type of work to be performed: weights to be emplaced by gripping or weights to be emplaced by cementing, or if desired other work operations.

From these parameters, the program defines as a function of the inertia of the rotating body, minimum and maximum values of speed of rotation for the range of angular spacings. The program then requires the asynchronous motor to turn between the minimum and maximum speeds thus determined as a function of the inertia and of the instantaneous angular spacing by acting on the energy supply delivered by the supply card 10 (FIG. 1).

Figure 3:
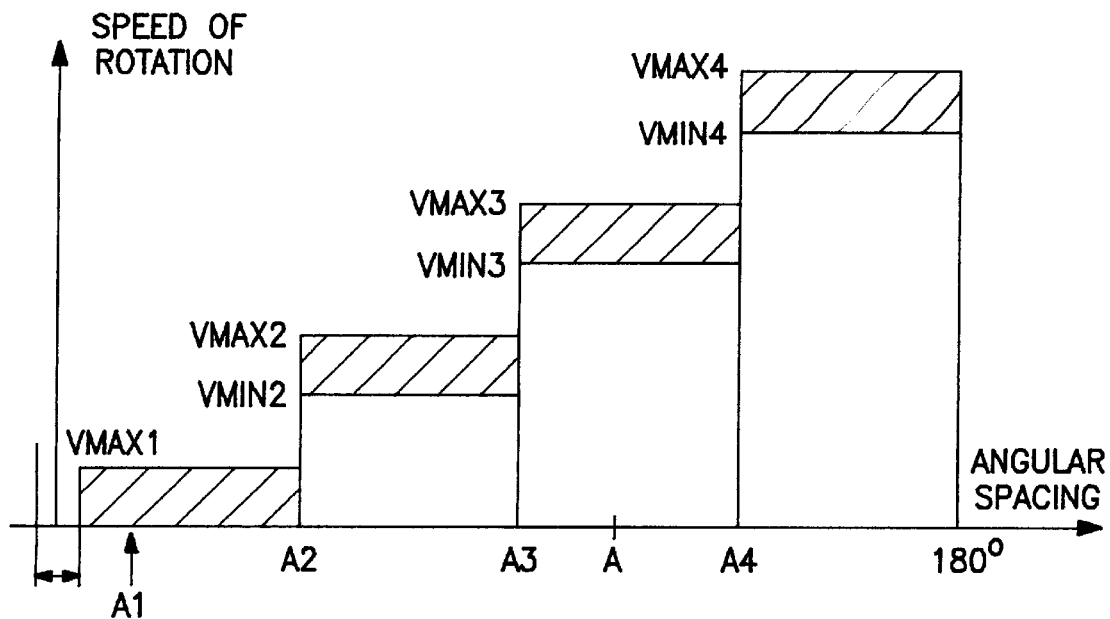
FIG. 3 shows schematically an explanatory diagram used to practice the process according to the invention.

In FIG. 3, there is shown on a diagram the influence of the program on the speed of rotation of the movable apparatus 6, 7, 8, and 9 for a known movable inertia device defining the values: Vmax1, Vmin2, Vmax2, Vmin3, Vmax3, Vmin4, Vmax4. Of course, these values can be continuously developed or by stages as a function of the ranges of inertia of the rotating bodies to be balanced.

The operation of the program is as follows: for a given angular spacing A, one must operate in the cross-hatched regions. As a result, if the speed of rotation is greater for example for an instantaneous angular spacing A comprised between $A_3$ and $A_4$ at the maximum speed Vmax3, the motor 1 is braked by sending to it a "negative" power tending to cause the motor to turn in the opposite direction until it operates in the cross-hatched area. Conversely, if this speed is less than the minimum speed Vmin3, supplemental electric power is supplied to increase the speed of rotation until it is located in the cross-hatched area.

To the extent that the target value is approached, which is to say zero corresponding to the predetermined radial direction sought, the maximum and minimum speeds decrease, which contributes to the slowing of the movable apparatus. Below a certain angular spacing A2, the minimum speed is low or near zero and the maximum speed is limited to the threshold Vmax1. When the movable apparatus reaches the angular spacing A1, the electromagnetic brake 2 or any other equivalent brake (pneumatic, hydraulic or mechanical) brakes the motor 1 in a measured way to slow it substantially. The movable apparatus 6, 7, 8 and 9 continues to coast and reaches the vicinity of zero in a range I of tolerable uncertainty. As soon as the angular spacing is less than the range I, the brake 2 acts definitively to stop and block the motor 1, the pulleys 3 and 5 and the movable apparatus 6, 7, 8 and 9 in rotation until the balancing weight has been emplaced by the operator and the latter has restarted the machine preferably manually.

The invention is particularly advantageous in that it permits the use of an asynchronous single-phase electric motor of known type and of current use in balancing devices, particularly vehicle wheel balancing devices and in that the fuzzy logic used for control of the device permits obtaining very rapidly in a certain manner the stopping of the rotating body in the desired predetermined radial positions.

After having emplaced the balancing weight and manually restarted the wheel, the program carries out an analogous cycle for the second weight plane and the second predetermined radial direction by using the same process as that set forth with respect to FIG. 3.

Figure 4:
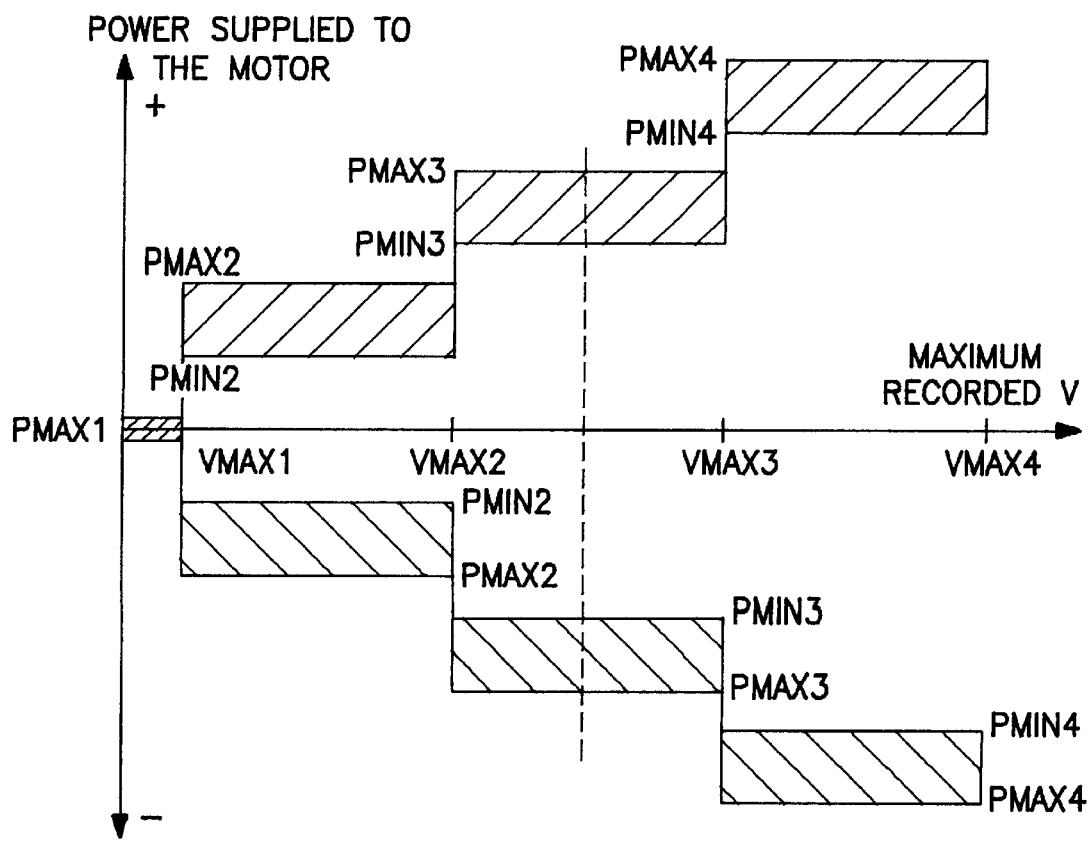
FIG. 4 shows schematically another illustrative diagram used to practice the process according to the invention.

In FIG. 4, there is shown a diagram representative of the manner of programming of the power supplied to the motor as a function of the value of the instantaneous speed of the motor supplied by the optical detector or other equivalent angular detector. Thus, by way of example, if the instantaneous speed V of the motor is between the speeds Vmax2 and Vmax3, the power supplied to the motor will be permitted within an area comprised between a minimum power Pmin3 and a maximum power Pmax3. There will be indicated by positive power a power supplied to the motor which tends to cause the motor to rotate in the actual direction of rotation at that moment and by negative power an electrical power supplied to the motor which tends to cause the motor to turn in a direction contrary to its actual direction of rotation at that instant, that is, to carry out an electrical braking of the motor.

The power control is effected easily by detecting the instant of passage through the zero phase of the sector and by triggering the conductivity of the triacs at an instant determined relative to this instant of passage through zero of the sector phase to obtain the positive or negative electrical powers desired.

The principle of operation of triggering the conductivity of the triac to produce a positive or negative electrical power is well known and does not require detailed description. It suffices only to point out that the maximum power Pmax1 for a very low speed is very much less than the blocking power of the brake associated with the electrical motor and is not likely to heat substantially the windings of the asynchronous single-phase electrical motor used preferably in the present invention. Preferably, the motor is immobilized before cutting its electrical supply.

Figure 5:
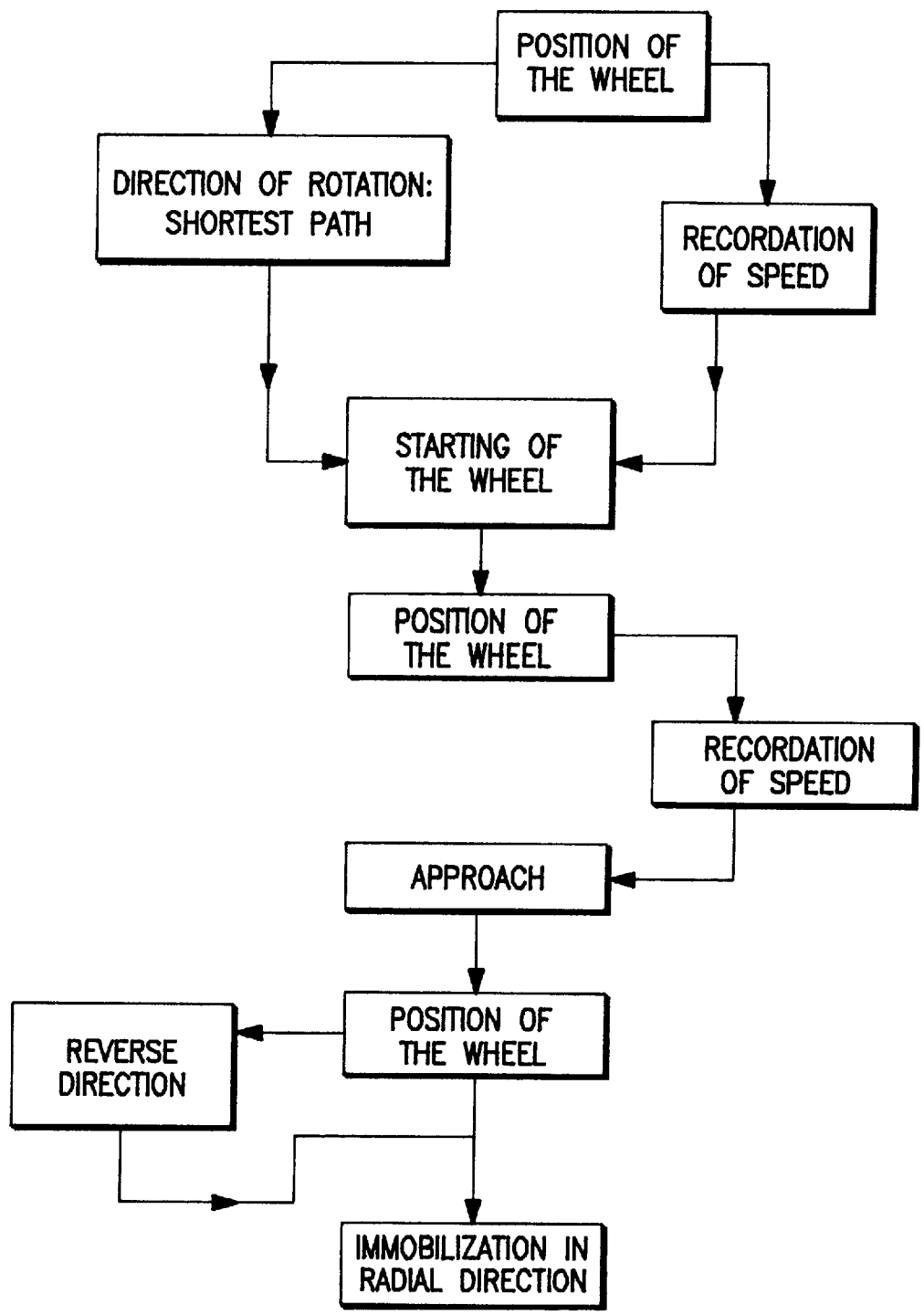
FIG. 5 shows schematically a representative organigram of the process according to the invention.

With reference to FIG. 5, a schematically organigram of the operation of the invention comprises the following steps:
a) recognizing the instantaneous position of the wheel, its direction of rotation is immediately determined so as to use the shortest path to reach the blockage in the desired predetermined radial direction and there is selected a speed order as described with reference to FIG. 3,
b) the wheel is started with a positive or negative power relative to a predetermined direction of rotation selected according to the position of the wheel and spaced or not by more than 180° from the predetermined radial position envisioned,
c) turning of the wheel continues whilst reducing stepwise the speed order as a function of the instantaneous position of the wheel, as described with reference to FIG. 3, to reach the approach phase, which is to say the angular spacing $A_1$ of FIG. 3 or there is carried out a slowing by braking and the wheel is permitted to continue to free-wheel,
d) the position of the wheel is continuously observed and the wheel is immobilized in the desired radial direction with the brake or,
e) in the case in which immobilization was not fairly rapid, there is delivered a reverse direction impulse from the position of the wheel to turn it slightly backward and to immobilize the wheel in the envisioned radial direction with the help of the brake.

According to a preferred embodiment, there is used to determine the minimum speeds Vmin and the maximum speeds Vmax as a function of the parameter representative of the inertia of the rotating body, not only a parameter representative of the inertia of the rotating body as such, but also the dispersion of the values, which is to say a parameter representative of the imbalance itself of the rotating body when this imbalance is very great and prevents the wheel from turning regularly.

The invention described with reference to particular embodiments is in no way thereby limited and on the contrary covers all modifications of shape and variations of embodiment: thus, the electrically actuated brake mounted on the motor shaft can be integrated with the motor (motor-brake available commercially) or be independent of the motor. As a modification, the brake can be mounted on any structure of the movement transmission and it can be pneumatic, hydraulic or constituted by an electromagnet operating a disc brake.

What is claimed is:
1. Process for balancing a rotating body able to be driven in rotation, by adding balancing weights, comprising the following steps:
a) starting the body in rotation with a driving means and measuring the unbalance with a balancing apparatus,
b) computing the balancing weights to be emplaced in each weight plane at a predetermined diameter of the rotating body, and measuring a physical parameter that varies as a function of the inertia of the rotating body, for defining minimum and maximum speed limits of rotation, and operating the driving means to drive the rotating body between said minimum and maximum speed limits of rotation,
c) stopping and blocking the driving means for automatically positioning and locking the rotating body in a first predetermined radial position, for enabling the emplacement of a first balancing weight at said first position by an operator,
d) after having emplaced the first balancing weight, moving the rotating body beyond the first position reached in step c), for restarting the body into rotation, and
e) stopping and blocking the driving means for automatically positioning and locking the rotating body in a second predetermined radial position, for enabling the emplacement of a second balancing weight at said second position by the operator.

2. Process according to claim 1, wherein the rotating body is displaced manually in step d).

3. Balancing apparatus for a rotating body by addition of balancing weights, comprising:
driving means to start and drive the body in rotation and to measure the unbalance,
means to measure a physical parameter representative of the inertia of the rotating body and to compute the balancing weights to be emplaced in each weight plane at a predetermined diameter of the rotating body, means using said physical parameter for defining minimum and maximum speed limits of rotation, and operating said driving means to drive the rotating body between said minimum and maximum speed limits of rotation, means to stop and block the driving means for automatically positioning and locking the rotating body in a first predetermined radial position for enabling the emplacement of a first balancing weight by an operator in a first weight plane at said first predetermined radial position, and means for restarting the body in rotation after having moved the rotating body beyond said first predetermined radial position for seeking a second predetermined radial position and enabling the emplacement of a second balancing weight by the operator in a second weight plane at said second predetermined radial position.

4. Apparatus according to claim 3, wherein the driving means to start, drive, stop and block the rotating body comprise an asynchronous motor with two directions of rotation associated with a brake.

5. Apparatus according to claim 4, further comprising electrical means for regulating the energy in two directions of rotation.

* * * * *